June 22, 1937.  W. BUSCHBECK  2,084,836

ALTERNATING CURRENT METER

Filed March 4, 1936

INVENTOR
Werner Buschbeck,
BY
ATTORNEY

Patented June 22, 1937

2,084,836

UNITED STATES PATENT OFFICE 2,084,836

ALTERNATING CURRENT METER

Werner Buschbeck, Berlin, Germany, assignor to Telefunken Gesellschaft für Drahtlose Telegraphie m. b. H., Berlin, Germany, a corporation of Germany Application March 4, 1936, Serial No. 67,054. In Germany March 6, 1935

2 Claims. (Cl. 250—17)

This invention relates to means for comparing the phase relation between two alternating current waves, and is useful to tune parallel-connected transmitter stages.

Figure 1:
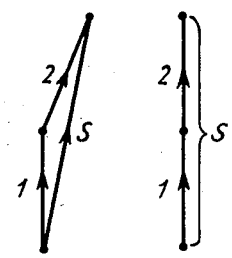
Figure 2:
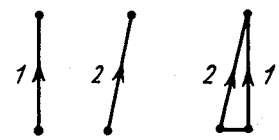
Figure 3:
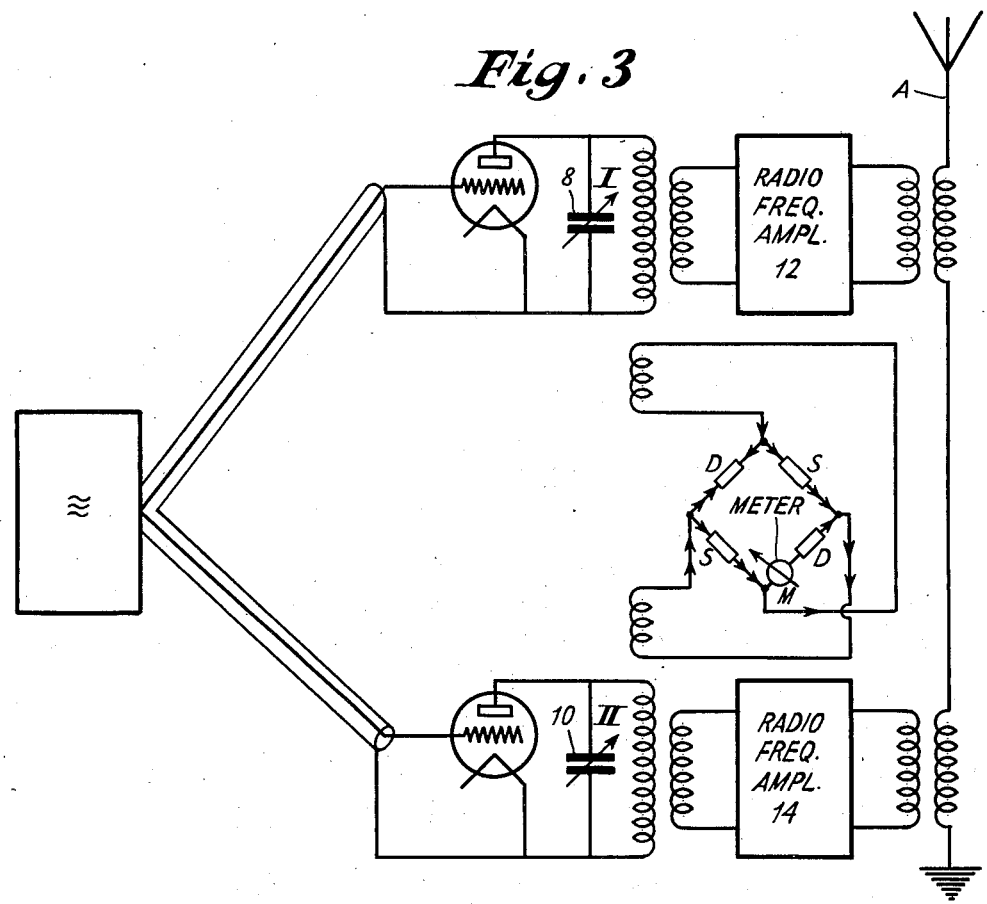

In describing my invention, reference will be made to the attached drawing wherein Figs. 1 and 2 are vectors illustrating phase relation between combined waves, while Fig. 3 illustrates a circuit adaptation of my wave phase comparing means.

It is known from practical experience that certain natural limitations are imposed on the production of large powers where short waves are used. The dimensions of tubes and other parts in transmitter equipment which, of course, grow with growth of the power used, finally reach a point where tuning the apparatus to any desired short wave is no longer possible. The paralleling of tubes of smaller size is also restricted and has a lower limit owing to the inevitable increase in inductances and capacitances of the leads to the tubes. These difficulties, as known from the art, may be obviated by paralleling several synchronized and complete transmitter stages (that is to say, the tubes and oscillation circuits) of small unit power and working upon a common output circuit with which the several complete stages are in parallel. In order to obtain a satisfactory efficiency, the constituent stages, of course, must be connected in phase to the joint output circuit. However, this condition is by no means easy to fulfill, least of all when between the common control stage and the power stages there are intermediate amplifier stages, for in such a scheme the phase displacement angles of the waves produced in the different stages are liable to become added to one another. The usual tuning of the common final or power circuits or common antenna to maximum amplitude furnishes a very inexact and unreliable clue as to the phase relations of the several combined waves because the absolute value of vectorial summation S of two vectors 1 and 2 differing but slightly in phase distinguishes itself almost inappreciably from the absolute sum of in-phase vectors 1 and 2 of Figs. 1 and 2.

Inasmuch as in-phase operation is necessary also from the viewpoint of efficiency, paralleled stages being similar to one another are to be tuned according to the invention while comparing their relative phase positions, and this is particularly easily accomplishable by measuring the difference of their voltage or current vectors. Proceeding in this manner, no serious phase error is able to arise even where there are several intermediate stages. A comparison of vectorial differences, most particularly so when the vectors 1 and 2 have the same absolute size, is extremely precise as shown in Fig. 2, because in this instance, in case of phase equality, the vector difference is zero, whereas, in the presence of slight discrepancies in the absolute values of the two quantities, there will be found a very sharp and distinct minimum. To ascertain the vectorial difference, recourse may be had to a number of widely different methods. But in this connection, care must be taken so that no spurious couplings will be set up between the stages to be compared by way of the measuring devices.

One exemplified embodiment is shown in Fig. 3. The two transmitter stages I and II whose phases are to be determined are connected with corresponding corners of a bridge scheme, one arm of which contains an ammeter or voltmeter M. Inasmuch as both stages work upon a balanced bridge, they have not further coupling by way of the measuring outfit, although in the various bridge arms the currents of the two stages become superposed, this occurring, as shown in Fig. 3 in such a manner that in opposite arms of the bridge there arises the sum total or the difference of the currents. If the couplings of the bridge are so set that the instrument M contained in the difference arm shows the same reading with the upper or the lower stage being disconnected, the deflection will disappear in the case of in-phase condition of stages I and II. The variable capacities 8 and 10 permit the stages I and II to be tuned until the desired phase relation between the high frequency waves is obtained and indicated by the reading of meter M. The waves may be amplified in units 12 and 14 and impressed on a common antenna A. The bridge circuit consists of two pairs of arms including impedances D,D and S,S.

Another method would, for instance, consist in transposing the frequencies of the two stages to be compared by the aid of a heterodyne and rectification in two synchronous intermediate frequencies, so that when the output ends are connected differentially, phase equality would be indicated for the two stages on passing through the minimum or zero point.

What is claimed is:

1. In a system for comparing the phase relation between two alternating current sources of substantially the same frequency without producing coupling between said sources, a bridge circuit having four arms each of which includes an impedance, a circuit coupling one diagonal of said bridge to one of said sources, a circuit coupling the other diagonal of said bridge to the other of said sources, and a meter in an arm of said bridge wherein the currents produced by said source oppose each other.

2. Means for synchronizing the oscillations in two high frequency oscillatory circuits including, a bridge circuit having four arms, a separate coupling between each of said oscillatory circuits and different pairs of diagonal points on said bridge circuit, a meter in an arm of said bridge wherein the currents produced by said separate couplings oppose to produce indications of lack of synchronism of oscillations in said oscillation circuits, and means in at least one of said oscillation circuits for tuning the same to restore synchronism of said oscillations in said circuits.

WERNER BUSCHBECK.